(12) United States Patent
Kellas-Dicks et al.

(10) Patent No.: US 8,332,932 B2
(45) Date of Patent: *Dec. 11, 2012

(54) KEYSTROKE DYNAMICS AUTHENTICATION TECHNIQUES

(75) Inventors: Mechthild R. Kellas-Dicks, Coquitlam (CA); Yvonne J. Stark, North Bend, WA (US)

(73) Assignee: Scout Analytics, Inc., Issaquah, WA (US)

(*) Notice: Subject to any disclaimer, the term of this patent is extended or adjusted under 35 U.S.C. 154(b) by 1105 days.

This patent is subject to a terminal disclaimer.

(21) Appl. No.: 11/952,882

(22) Filed: Dec. 7, 2007

(65) Prior Publication Data

US 2009/0150992 A1    Jun. 11, 2009

(51) Int. Cl.
G06F 7/04 (2006.01)
G06F 21/00 (2006.01)
(52) U.S. Cl. .............................. 726/18; 726/19; 713/186
(58) Field of Classification Search .................... 726/18, 726/19; 713/186
See application file for complete search history.

(56) References Cited

U.S. PATENT DOCUMENTS

| | | | |
|---|---|---|---|
| 3,993,976 A | 11/1976 | Ginsburg | |
| 4,197,524 A | 4/1980 | Salem | |
| 4,455,588 A | 6/1984 | Mochida et al. | |
| 4,499,462 A | 2/1985 | Stoesser et al. | |
| 4,621,334 A | 11/1986 | Garcia | |
| 4,805,222 A | 2/1989 | Young et al. | |
| 5,060,263 A | 10/1991 | Bosen et al. | |
| 5,161,245 A | 11/1992 | Fenwick | |
| 5,181,238 A | 1/1993 | Medamana et al. | |
| 5,222,195 A | 6/1993 | Alkon et al. | |
| 5,276,769 A | 1/1994 | Ueda et al. | |
| 5,371,809 A | 12/1994 | Desieno | |
| 5,544,255 A | 8/1996 | Smithies et al. | |
| 5,557,686 A * | 9/1996 | Brown et al. ................. | 382/115 |
| 5,675,497 A | 10/1997 | Petsche et al. | |
| 5,764,889 A | 6/1998 | Ault et al. | |
| 5,793,952 A | 8/1998 | Limsico | |
| 5,802,507 A | 9/1998 | Gentric et al. | |
| 5,910,989 A | 6/1999 | Naccache | |
| 5,930,804 A | 7/1999 | Yu et al. | |
| 6,062,474 A | 5/2000 | Kroll | |
| 6,070,159 A | 5/2000 | Wilson et al. | |
| 6,151,593 A * | 11/2000 | Cho et al. ........................ | 706/16 |

(Continued)

FOREIGN PATENT DOCUMENTS

EP    1251468    10/2002

(Continued)

OTHER PUBLICATIONS

Gamboa et al., A Behavioural Biometric System Based on Human Computer Interaction, Proceedings of DPIE, 2004.*

(Continued)

Primary Examiner — Kambiz Zand
Assistant Examiner — Teshome Hailu
(74) Attorney, Agent, or Firm — Blakely Sokoloff Taylor & Zafman LLP (57) ABSTRACT

A keystroke dynamics authentication system collects measurements as a user types a phrase on a keyboard. A first set of derived data values are computed based on the collected measurements, and then a second set of derived data values are computed based on the first set of derived values. The first and second sets of derived values are used to construct a template for identifying the user based on his typing.

22 Claims, 7 Drawing Sheets

U.S. PATENT DOCUMENTS

| | | | |
|---|---|---|---|
| 6,167,439 | A | 12/2000 | Levine et al. |
| 6,272,479 | B1 | 8/2001 | Farry et al. |
| 6,307,955 | B1 | 10/2001 | Zank et al. |
| 6,334,121 | B1 | 12/2001 | Primeaux et al. |
| 6,405,922 | B1 | 6/2002 | Kroll |
| 6,421,450 | B2 | 7/2002 | Nakano |
| 6,513,081 | B2 | 1/2003 | Culhane |
| 6,597,775 | B2 | 7/2003 | Lawyer et al. |
| 6,839,682 | B1 | 1/2005 | Blume et al. |
| 6,850,606 | B2 | 2/2005 | Lawyer et al. |
| 6,865,566 | B2 | 3/2005 | Serrano-Morales et al. |
| 6,903,723 | B1 | 6/2005 | Forest |
| 6,944,604 | B1 | 9/2005 | Majoor |
| 6,965,889 | B2 | 11/2005 | Serrano-Morales et al. |
| 6,968,328 | B1 | 11/2005 | Kintzer et al. |
| 6,993,514 | B2 | 1/2006 | Majoor |
| 7,246,243 | B2 | 7/2007 | Uchida |
| 7,701,364 | B1* | 4/2010 | Zilberman ............... 341/22 |
| 2001/0036297 | A1 | 11/2001 | Ikegami et al. |
| 2002/0171603 | A1 | 11/2002 | Chen et al. |
| 2004/0005995 | A1 | 1/2004 | Edelson |
| 2004/0034788 | A1 | 2/2004 | Ross |
| 2004/0059950 | A1* | 3/2004 | Bender et al. ............ 713/202 |
| 2004/0103296 | A1 | 5/2004 | Harp et al. |
| 2004/0162999 | A1 | 8/2004 | Schreiber et al. |
| 2004/0187037 | A1 | 9/2004 | Checco |
| 2005/0008148 | A1 | 1/2005 | Jacobson |
| 2005/0058324 | A1 | 3/2005 | Karthik |
| 2005/0149463 | A1 | 7/2005 | Bolt et al. |
| 2006/0016871 | A1 | 1/2006 | Bonalle et al. |
| 2006/0064037 | A1* | 3/2006 | Shalon et al. ............ 600/586 |
| 2006/0136744 | A1 | 6/2006 | Lange |
| 2006/0222210 | A1 | 10/2006 | Sundaram |
| 2006/0242424 | A1* | 10/2006 | Kitchens et al. ......... 713/183 |
| 2007/0009140 | A1 | 1/2007 | Jitsui et al. |
| 2007/0245151 | A1 | 10/2007 | Phoha et al. |
| 2008/0028231 | A1* | 1/2008 | Bender ................... 713/186 |

FOREIGN PATENT DOCUMENTS

| | | |
|---|---|---|
| JP | 11253426 | 9/1999 |
| JP | 11306351 | 11/1999 |
| JP | 2004013831 A | 1/2004 |

OTHER PUBLICATIONS

Orozco et al., Automatic Identification of Pasticipants in Haptic System, Instrumentation and Measurements Technology Conference, Canada, 2005.*

"Keystroke Dynamics Authentication of Computer Terminal Users", Bioaccess System 2000, 2000A, 2001, 2011, and OEM, Jun. 29, 1984.

Biopassword, "Technical Report. BioPassword Keystroke Dynamics", http://web.archive.org/web/20040807231; http://www.biopassword.com/home/technology/BP%204.5%20Technical%20Paper.pdf, (Oct. 18, 2001).

Bleha, S., et al., "Computer-Access Security Systems Using Keystroke Dynamics", IEEE Transactions on Pattern Analysis and Machine Intelligence, 12(12), (Dec. 1990), 1217-1222.

Brown, M., et al., "User Identification via Keystroke Characteristics of Typed Names Using Neural Networks", Int. Journal of Man-Machine Studies, 39(6), (1993), 99-1014.

Cotton, I. W., et al., "Approaches to Controlling Personal Access to Computer Terminals", IEEE Proceedings of the 1975 Symposium on Computer Networks: Trends & Applications, (1975).

Fielding, R., et al., "Hypertext Transfer Protocol—HTTP 1.1", RFC2616 dated Jun. 1999, 177 pages.

Gaines, R., et al., "Authentication by Keystroke Timing: Some Preliminary Results", Rand Co. R-2526-NSF, (May 1980).

Ilonen, J., "Keystroke dynamics", Advanced topics in information processing 1—lectures, Lappeenranta University of Technology, Department of Information Technology, (2003), 1-15.

Jain, A. K., et al., "Artificial Neural Networks: A Tutorial", Computer, 29(3), (Mar. 1996), 31-44.

Kullback, S., Information Theory & Statistics, John Wiley & Sons Inc., (1959), 3383.

Leggett, J., et al., "Verifying identity via keystroke characteristics", Int. Journal of Man-Machine Studies, 28(1), (1988), 67-76.

Lippmann, R. P., et al., "An Introduction to Computing with Neural Nets", IEEE ASSP Magazine, 4(2), (Apr. 1987), 4-22.

Monrose, F., et al., "Authentication via Keystroke Dynamics", Proc. of the ACM Workshop, ACM Conference on Computer Communications Security, (1997), 48-56.

Monrose, F., et al., "Keystroke dynamics as a biometric for authentication", Future Generation Computer Systems, vol. 16, (2000), 351-359.

Peacock, A., et al., "Typing patterns: a key to user identification", IEEE Computer Society, vol. 2, No. 5, (Sep. 2004). 40-47.

Rennick, R. J., et al., "Mufti-A Multi-Function ID System", WESCON Tech. Papers, (1975).

Riganati, J. P., "An Overview of Electronic ID Systems", WESCON Tech. Papers, (1975).

Robinson, J. A., et al., "Computer User Verification Using Login String Keystroke Dynamics", IEEE Transactions on Systems, Man and Cybernetics—Part A: Systems and Humans, vol. 28, No. 2, (Mar. 1998), 236-241.

Saltzer, J. H., et al., "The Protection of Information in Computer System", Proceedings of the IEEE, vol. 63, No. 9, (Sep. 1975), 1278-1308.

Sedgwick, J., "The Body Code Machines: These New Computerized Devices Can Recognize You Anywhere", This World, (Jan. 9, 1983), 9-10.

Sheng, Y., et al., "A parallel decision tree-based method for user authentication based on keystroke patterns", IEEE Transactions on Systems, Man and Cybernetics—Part B: Cybernetics, 35(4), (Aug. 2005), 836-833.

U.S. Dept. of Comm./NBS, "Guidelines on Evaluation of Techniques for Automated Personal ID", FIPS, PUB 48, Apr. 1, 1977.

Umphress, D., et al., "Identity Verification Through Keyboard Characteristics", Int. J. Man-Mach. St., (1985), 263-273.

Admitone Security, Inc., Non final office action dated Jun. 2, 2009 for U.S. Appl. No. 11/396,786.

Admitone Security, Inc., Non final office action dated Jun. 8, 2009 for U.S. Appl. No. 11/317,685.

Admitone Security, Inc., Final Office Action dated Jul. 14, 2009 for U.S. Appl. No. 11/349,814.

Admitone Security, Inc., Non final office action dated Aug. 6, 2009 for U.S. Appl. No. 11/426,568.

Penn State Research Foundation, Final Office Action dated May 11, 2009 for U.S. Appl. No. 11/241,103.

* cited by examiner

KEYSTROKE DYNAMICS AUTHENTICATION TECHNIQUES

FIELD

The invention relates to keystroke dynamics authentication. More specifically, the invention relates to data manipulations that offer improved performance for keystroke dynamics authentication systems.

BACKGROUND

Computer systems often contain valuable and/or sensitive information, control access to such information, or play an integral role in securing physical locations and assets. The security of information, assets and locations is only as good as the weakest link in the security chain, so it is important that computers reliably be able to distinguish authorized personnel from impostors. In the past, computer security has largely depended on secret passwords. Unfortunately, users often choose passwords that are easy to guess or that are simple enough to determine via exhaustive search or other means. When passwords of greater complexity are assigned, users may find them hard to remember, so may write them down, thus creating a new, different security vulnerability.

Various approaches have been tried to improve the security of computer systems. For example, in "have something, know something" schemes, a prospective user must know a password (or other secret code) and have (or prove possession of) a physical token such as a key or an identification card. Such schemes usually provide better authentication than passwords alone, but an authorized user can still permit an unauthorized user to use a system simply by giving the token and the secret code to the unauthorized user.

Other authentication methods rely on measurements of unique physical characteristics ("biometrics") of users to identify authorized users. For example, fingerprints, voice patterns and retinal images have all been used with some success. However, these methods usually require special hardware to implement (e.g., fingerprint or retinal scanners; audio input facilities).

Techniques have been developed that permit computer users to be authenticated at machines without any special hardware. For example, U.S. Pat. No. 4,805,222 to Young et al. describes verifying the identity of an individual based on timing data collected while he types on a keyboard. Identification is accomplished by a simple statistical method that treats the collected data as an n-dimensional vector and computes the Euclidean distance between this vector and a reference vector. More sophisticated analyses have also been proposed. For example, U.S. Pat. No. 6,151,593 to Cho et al. suggests using a neural network to classify keystroke timing vectors as "like" or "unlike" a set of sample vectors, and U.S. Patent Application No. U.S. 2007/0245151 by Phoha et al. describes a specific neural-network-like method for creating keystroke dynamics templates from collected data, and using the templates to identify users.

The problem of comparing a biometric sample to a template or reference sample to determine whether the sample was produced by the same person who created the template or reference sample is a difficult one. Improved algorithms to produce biometric templates and to validate biometric samples may be useful in producing more accurate identifications with reduced false acceptance rates ("FAR") and false reject rates ("FRR").

SUMMARY

Embodiments of the invention collect raw keystroke timing measurements as a user types on a computer keyboard. First-order derived data values are computed from the raw timing measurements. Then, second-order derived data values are computed from some of the first-order values. The first-order and second-order derived data values are used to produce a template that can be used to recognize a user's typing style. The derived data is also used during authentication, when a user submits a typing sample to be compared with a template to authenticate the user's claimed identity.

BRIEF DESCRIPTION OF DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

DETAILED DESCRIPTION

Figure 1:
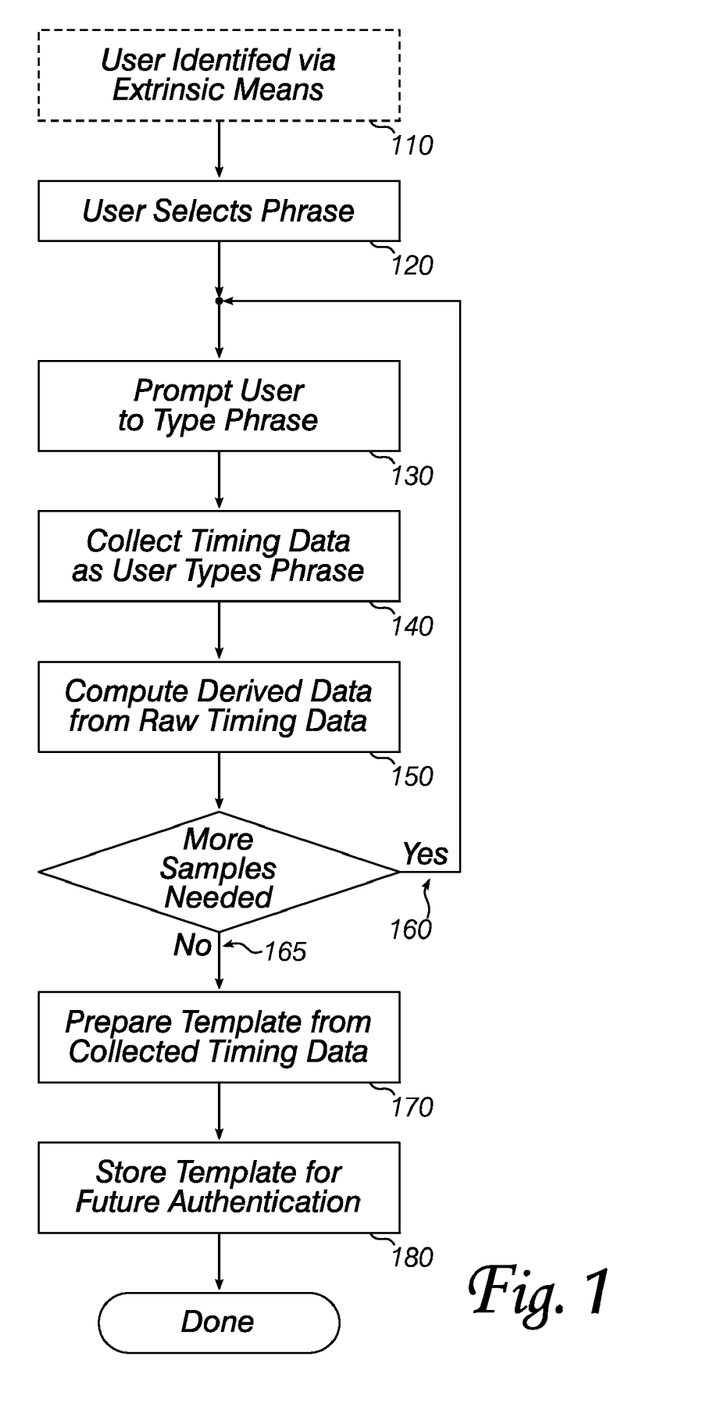
FIG. 1 is a flow chart outlining the construction of a keystroke dynamics user authentication template according to an embodiment of the invention.
Figure 2:
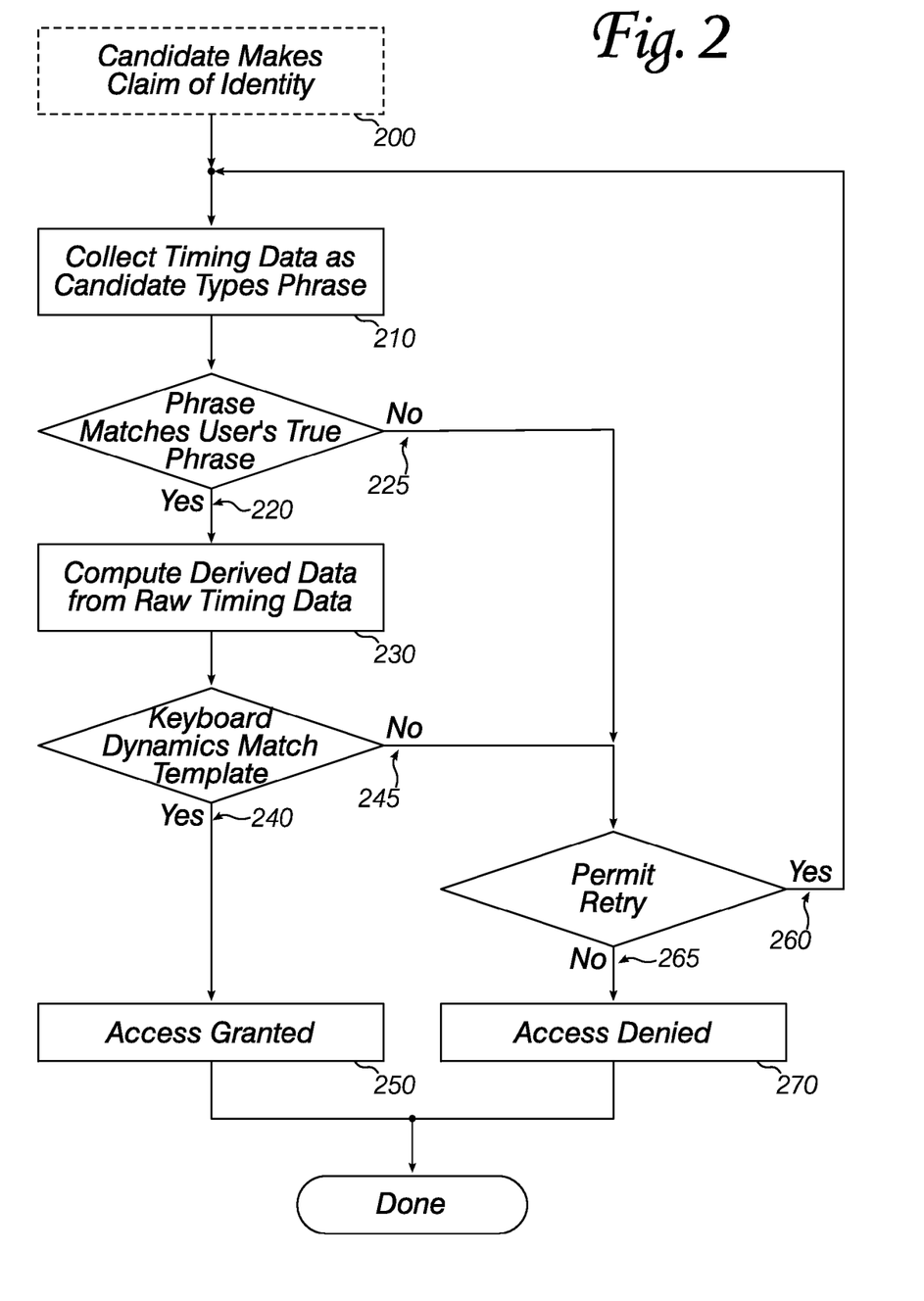
FIG. 2 is a flow chart outlining the use of a template constructed according to an embodiment of the invention.

FIGS. 1 and 2 are flow charts outlining the two principal sets of operations in an embodiment of the invention: enrollment (i.e., preparing a biometric template), and authentication (i.e., using a biometric template). In enrollment (FIG. 1), a user may be identified by extrinsic means (110). For example, a security officer may check the user's photo identification, fingerprints, or other identifying characteristics. In some embodiments, extrinsic identification is not necessary: the system is only being used to ensure that the person who enrolled at a first time is the same as the person who wishes to use the computer system (or other protected resource) at a later time.

After (optional) extrinsic identification, the user selects a phrase (120). In many embodiments, the phrase is the user's (secret) password, but it is not necessary that the phrase be secret, or even that it be unique to the user. In some systems, a user may use two or more phrases during enrollment and verification. For example, the first phrase may be the user's login name or email address, and the second phrase may be his password.

An embodiment prompts the user to type the phrase (130), and collects timing data as the user types it (140). The user signals the end of the phrase by typing a key like "Enter," "Return," "Send" or "Tab," or by pressing a button of a mouse or other user interface device. Next, derived data is computed from the raw timing data values (150). Based on the collected samples, if more samples are needed (160), the collection and computation process repeats. If an adequate number of samples have been collected (165), then a template is prepared from the collected timing data (170) and stored for use in subsequent authentication operations (180).

FIG. 2 outlines one such subsequent authentication operation: a prospective user ("candidate") may claim to be a legitimate user of the system (200). The system collects timing data as the candidate types a phrase (210). The phrase is compared lexically with the phrase of the legitimate user, and if they match (220), derived timing data is computed from the collected raw timing data (230). Next, this timing data is compared with the corresponding template that was created during enrollment, and if there is again a match (240), the candidate is granted access to the system or other resource (250). If the phrase typed by the candidate does not match the legitimate user's phrase (225), or if the keystroke dynamics differ (245), the system may permit the candidate to try typing the phrase again (260). If the permissible number of retries is exhausted (265), the candidate is denied access to the system or resource (270).

In some embodiments, a candidate need not make any assertion as to his identity. He may simply type a phrase, which the system compares to all enrolled users' phrases and keystroke dynamics templates. If the candidate's typed phrase matches one of these, he is granted access according to the matching template.

Figure 3:
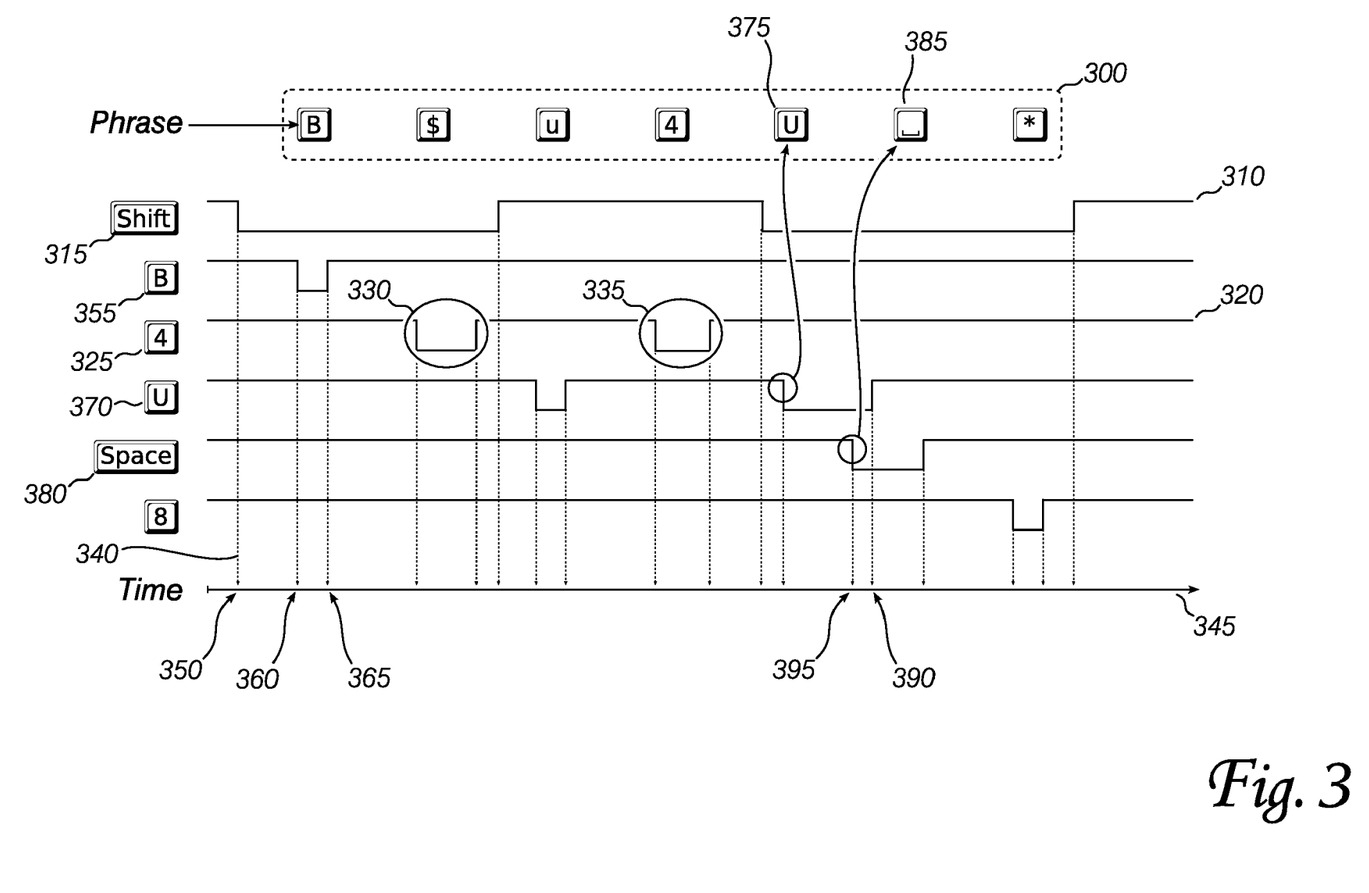
FIG. 3 illustrates keyboard events that occur during the typing of a phrase.

FIG. 3 is a graphical depiction of a phrase 300 and the corresponding keyboard activity that may occur during typing of the phrase. Horizontal traces (e.g., 310, 320) indicate whether the corresponding keyboard keys (e.g., 315 and 325, respectively) are pressed. For example, the portion of trace 320 circled at 330 indicates a first press-and-release cycle of the '4' key 325, while the portion of trace 320 circled at 335 indicates the second press-and-release cycle of the same key.

Vertical dashed lines 340 indicate when a key press or key release event occurs by pointing to a spot along "Time" axis 345. For example, the first depression of the "Shift" key 315 occurs at time 350. Subsequently, the 'B' key 355 is depressed at time 360 and then released at time 365. Characters of the phrase 300 are produced in the order that character-generating keys are depressed. Two or more keys may be depressed simultaneously (for example, both "Shift" key 315 and '4' key 325 are depressed during the interval circled at 330. Character-generating keys are those that produce a character when they are depressed. Of the keys shown in this Figure, all except "Shift" key 315 are character-generating. The "Shift" key 315 is a modifier that may change the character produced when a character-generating key is depressed.

Sometimes a key release corresponding to a first key press may occur after the subsequent key press. This situation is depicted in FIG. 3: the second depression of 'U' key 370, which produces the upper-case 'U' 375 in phrase 300, continues until time 390, after the depression of "Space" key 380 at time 395 which produces the corresponding space character 385 in phrase 300.

An embodiment of the invention collects information about the depression and release of keys typed by a user during enrollment or during authentication. This information typically comprises the items listed in Table 1:

TABLE 1

| Key | Action | Timestamp |
|---|---|---|
| Shift | ↘ | 2007-Nov-19 14:28:34.000383 |
| B | ↘ | 2007-Nov-19 14:28:34.752886 |
| B | ↗ | 2007-Nov-19 14:28:34.813777 |
| 4 | ↘ | 2007-Nov-19 14:28:35.016915 |
| 4 | ↗ | 2007-Nov-19 14:28:35.104793 |
| Shift | ↗ | 2007-Nov-19 14:28:35.164335 |

TABLE 1-continued

| Key | Action | Timestamp |
|---|---|---|
| U | ↘ | 2007-Nov-19 14:28:35.609386 |
| U | ↗ | 2007-Nov-19 14:28:35.744492 |
| 4 | ↘ | 2007-Nov-19 14:28:36.027649 |
| 4 | ↗ | 2007-Nov-19 14:28:36.137421 |
| Shift | ↘ | 2007-Nov-19 14:28:36.460362 |
| U | ↘ | 2007-Nov-19 14:28:36.628027 |
| Space | ↘ | 2007-Nov-19 14:28:36.707690 |
| U | ↗ | 2007-Nov-19 14:28:37.143059 |
| Space | ↗ | 2007-Nov-19 14:28:37.209763 |
| 8 | ↘ | 2007-Nov-19 14:28:37.596926 |
| 8 | ↗ | 2007-Nov-19 14:28:37.640540 |
| Shift | ↗ | 2007-Nov-19 14:28:37.764426 |

In other words, each time a key is pressed or released, a record is produced identifying the key, the action and the time at which the action occurred. This is the only "real" or physical data collected in many embodiments. Special keyboards that can sense typing pressure, finger temperature, or the like, may produce more real data, but such keyboards are uncommon, and an embodiment gives up broader applicability if it relies on such enhanced data.

Figure 4:
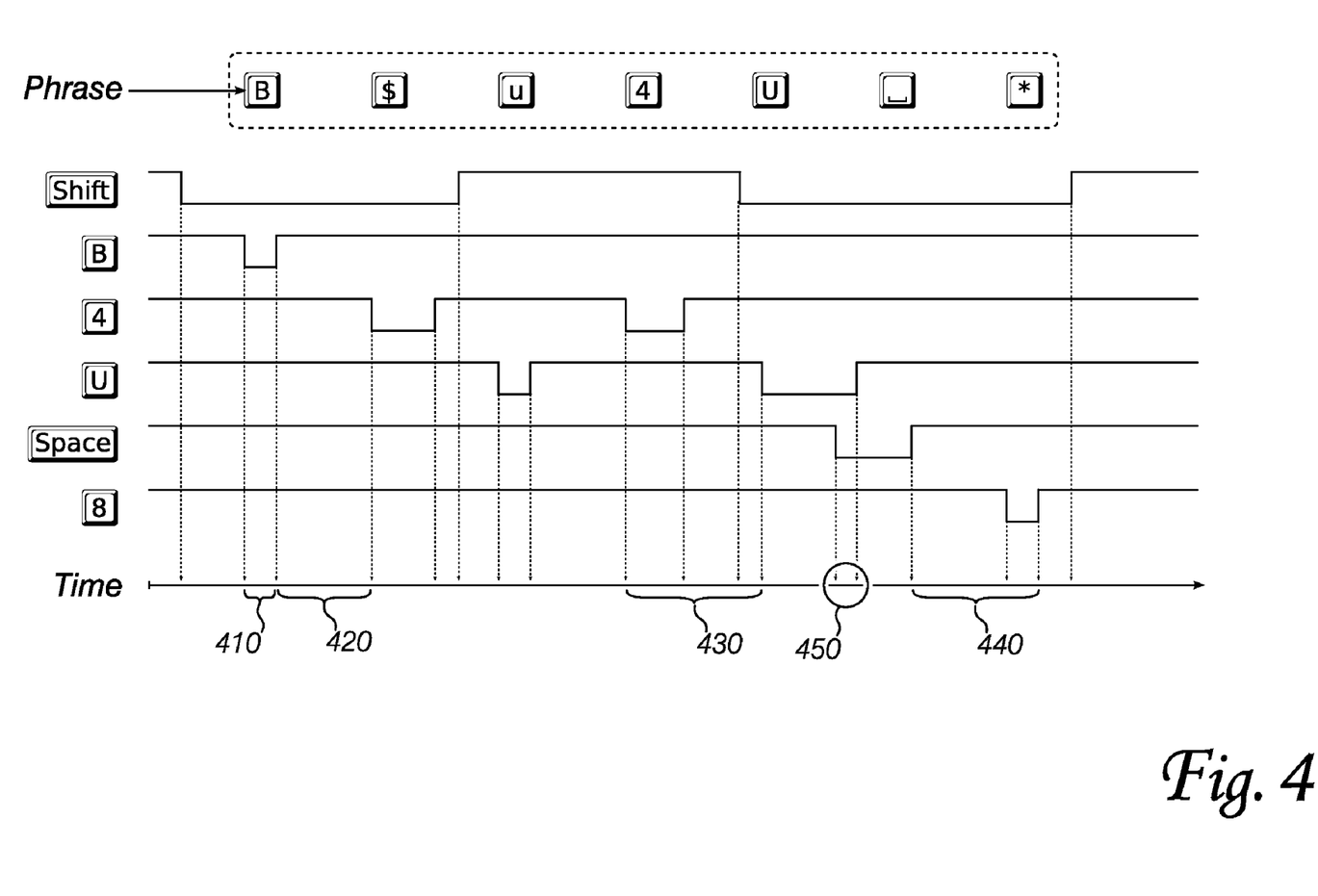
FIG. 4 shows first-order derived measurements that can be computed from the data collected while a user types a phrase.

Times may be given as real ("wall-clock") time (with the resolution and accuracy of a clock available to the system) or as a time relative to a known event such as the most recent system restart. Neither of these times is directly useful for analyzing keystroke dynamics of a user typing a phrase, so an embodiment of the invention computes a first set of derived data based on the collected raw timings. FIG. 4 shows several possible time periods that could be used by an embodiment (based on the same phrase entry key graph shown in FIG. 3). One simple, useful datum that can be computed from the raw keystroke timing data is the length of time a key is depressed 410, the "dwell time." Another useful measure is the time from the release of one key to the depression of the next 420, called the "flight time." Dwell and flight times can efficiently represent all of the key events that occur during the typing of a phrase. Note that flight time may be negative, as shown at 450: the 'U' key was not released until after the "Space" key was pressed, so the "U→Space" flight time is negative.

Other derived measures could also be used by an embodiment. For example, the key-press-to-subsequent-key-press time 430, or key-release-to-subsequent-key-release time 440 also permit the events that occurred during the typing of the phrase to be represented in a useful way. Some embodiments may compute key press and release times relative to the key press event that starts the entry of the phrase, or the key press (or release) event that ends entry of the phrase.

The first set of derived values can be computed trivially by subtraction. Table 2 shows dwell values thus computed from the raw key-press and key-release times shown in Table 1:

TABLE 2

| Key | Dwell |
|---|---|
| Shift | 1.163952 |
| B | 0.060891 |
| 4 | 0.087878 |
| U | 0.135106 |
| 4 | 0.109772 |
| Shift | 1.304064 |
| U | 0.515032 |
| Space | 0.502073 |
| 8 | 0.043614 |

Note that modifier dwell times are usually significantly longer than the dwell times of the keys they modify, and may not be as consistent due to variations in modifier key size, shape and location between keyboards. Some embodiments disregard modifier key-press and release events when computing derived values. These values (and ones like them) have been used successfully in the past to create biometric templates and to authenticate users. However, by further processing the first set of derived values to produce a second set of derived values, more keystroke dynamics information about the phrase entry can be exposed and used by an embodiment of the invention to improve a system's performance (e.g., to reduce the false-accept ratio, the false-reject ratio, or both).

One derived measurement that has proven to be particularly effective in improving system performance is the rate of change of key dwell during the entry of the phrase. This derived measurement is called the "dwell tendency." It indicates whether the user is holding keys for longer or shorter periods as the phrase entry proceeds. Thus, a negative dwell tendency means that the user's keypresses are becoming shorter, while a positive dwell tendency means that the user's keypresses are becoming longer. These correspond roughly to faster and slower typing, respectively. Of course, a user's typing speed may vary continuously during the typing of a phrase as a result of key pairs (and longer sequences) that are easier or harder to type. Table 3 shows dwell tendencies corresponding to the dwell times shown in Table 2:

TABLE 3

| Key | Dwell Tendency |
|---|---|
| B | |
| 4 | 0.026987 |
| U | 0.047228 |
| 4 | −0.025334 |
| U | 0.405260 |
| Space | −0.012959 |
| 8 | −0.458459 |

Figure 5:
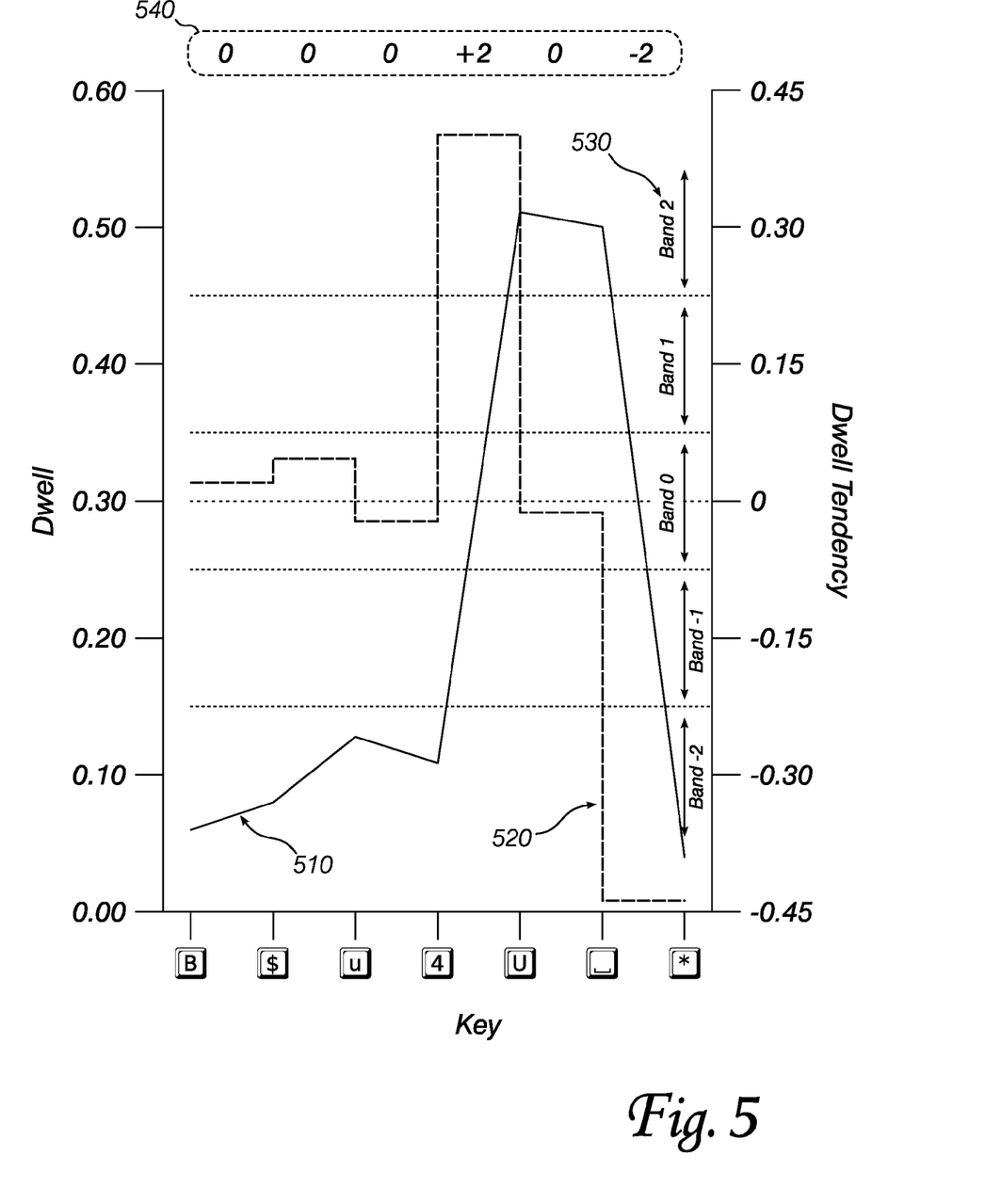
FIG. 5 is a graph of second-order derived measurements computed according to one embodiment of the invention.

FIG. 5 shows a graph of the dwell times and dwell tendencies corresponding to the sample raw key timings processed as discussed with respect to Tables 2 and 3. (As mentioned above, modifier key dwell times have been disregarded in this Figure.) Solid line 510 indicates the dwell times computed from the raw key event times, and dashed line 520 indicates the dwell tendencies computed from the dwell times. It has been discovered that quantizing dwell tendency into a small number of states (e.g., three to five states) before using the values in enrollment or verification gives superior results. In this graph, dwell tendency bands 530 from −2 to +2 have been defined, and quantized dwell tendency values 540 would be used as input to the enrollment or authentication processes. Other quantizations may separate dwell tendency into "decreasing," "constant" and "increasing" classifications.

An analogy can help explain how an embodiment of the invention improves keystroke dynamics identifications. Consider a system that is to identify vehicles based on a series of Global Positioning System ("GPS") fixes. Three different vehicles are to be distinguished: a bicycle, a container ship and an airplane. A raw GPS fix may provide only limited distinguishing power: any of the vehicles could be at many locations (to a certain degree of accuracy—it is appreciated that a bicycle is unlikely to be found in the middle of the ocean, or a container ship at an altitude much different from sea level). However, by computing a first set of derivative data from the raw GPS fixes, one obtains velocity-like measurements. Now, it may be possible to distinguish the airplane from the other vehicles, if it is traveling much faster than the speeds expected of the bicycle or container ship. At slower speeds, a second set of derived data may provide distinguishing clues. The "velocity tendency," which is the change in velocity between two samples, may be more variable for the bicycle than for the other vehicles. This is because it is easier for the bicycle to speed up, slow down, turn and stop, and more likely that it will do so. Higher-order derived data may highlight other aspects of the vehicles' motion. In general, the derived data values are like a (mathematical) derivative with respect to time of the raw data: GPS fixes provide location; the first derived data provides velocity; the second derived data provides acceleration; and so on. Higher-order derivatives may also contain useful information about the motion of a vehicle, but eventually, the repeated derivation process will produce a result that is uniformly zero. Mathematically, if the movement of the vehicle over the measurement period can be described or adequately approximated by a polynomial function of degree n, then the $(n+1)^{th}$ derivative of the function (as well as all higher-order derivatives) will be zero. An automated vehicle-distinguishing system that is provided with (or calculates) higher-order derived data from raw location data is likely to be more successful at distinguishing vehicles than a system that only considers vehicle location.

Returning to the keystroke dynamics analysis performed by embodiments of the invention, it has been observed experimentally that useful information can be obtained from second- and third-order derivatives of the keystroke timing data. Template preparation and user authentication may not be significantly improved by the use of fourth- and higher-order derivatives.

Other derived values that have been considered are shown in the following table. They are presented roughly in order of decreasing identificative power. That is, dwell tendency improves authentication accuracy (by reducing the False Accept Rate and False Reject Rate) more than flight tendency, which in turn improves accuracy more than curvature flight. Embodiments of the invention use one or more of these second derived data sets in connection with the preparation of biometric templates and the use of those templates to perform user authentication.

TABLE 4

| Derived Data | Definition | Distinguishing Power | Data Points |
|---|---|---|---|
| Dwell-Total | Sum of dwell times | 1.2337 | 1 |
| Dwell Mean | Average dwell time | 1.2337 | 1 |
| Dwell Root Product | $n^{th}$ root of (product of all n dwells) | 1.1437 | 1 |
| Dwell {d1, d2} | A vector of two consecutive dwells (Uses Euclidean distance to calculate distinguishing power) | 1.0701 | N − 2 |
| Dwell d1 + d2 + d3 | Dwell sums by threes | 1.0060 | N − 3 |
| Dwell d1 + d2 | Dwell pair sums | 0.9332 | N − 2 |
| Flight Min | Minimum flight time | 0.8529 | 1 |
| Dwell Max | Maximum dwell time | 0.8296 | 1 |
| $\sqrt{Dwell}$ | Square root of dwell time | 0.8172 | N |
| Dwell | Plain dwell time | 0.8142 | N |
| Log Dwell | Log dwell time | 0.8118 | N |
| Dwell/Total(D + F) | Ratio of dwell to dwell + flight total | 0.7925 | N |
| Dwell Min | Minimum dwell time | 0.6882 | 1 |
| Dwell Sd | Dwell standard deviation | 0.6817 | 1 |
| Flight Root Product | $(n − 1)^{th}$ root of (product of all n − 1 flights) | 0.6461 | 1 |

TABLE 4-continued

| Derived Data | Definition | Distinguishing Power | Data Points |
|---|---|---|---|
| Flight f * (1/f-Min − 1/f-Max) | f-Min: minimum of all flights<br>f-Max: maximum of all flights<br>For each flight f, calculate formula to the left | 0.6229 | N − 1 |
| Total Length | Phrase entry, start to finish | 0.6111 | 1 |
| Flight-Total | Sum of flight times | 0.5922 | 1 |
| Flight Mean | Mean flight time | 0.5922 | 1 |
| Parabola-A-Dwell | Highest order coefficient (of $x^2$) of a parabola through 3 consecutive points<br>Points are (x, y) = (position in string, dwell).<br>A measure for rhythm of 3 | 0.5321 | N − 2 |
| Dwell d1 − d2 | Dwell differences | 0.5318 | N − 1 |
| Flight {f1, f2} | Two-dimensional vectors of 2 consecutive flights | 0.5233 | N − 2 |
| Dwell/Max-Dwell | Ratio of dwell to maximum dwell | 0.5195 | N |
| Dwell d/Sum-d | Ratio of dwell to total dwell | 0.5180 | N |
| Dwell/Mean-Dwell | Ratio of dwell to mean dwell | 0.5180 | N |
| Flight/Median-Flight | Ratio of flight to median flight | 0.4987 | N − 1 |
| Dwell SND | Standard normal deviate:<br>(Dwell − Average(Dwell))/StdDev(Dwell) | 0.4967 | N |
| Flight | Flight time | 0.4877 | N − 1 |
| Dwell d1/d2 | Pairwise dwell ratios | 0.4830 | N − 1 |
| Up-Latency: f1 + d2 | Sum of one key's flight time and the next key's dwell time | 0.4812 | N − 1 |
| Flight/Total D + F | Ratio of flight time to total of dwells and flights | 0.4767 | N − 1 |
| Flight f1 + f2 | Pairwise flight time sums | 0.4609 | N − 2 |
| Flight f/Sum-f | Ratio of flight time to sum of all flight times | 0.4596 | N − 1 |
| Flight/Mean-Flight | Ratio of flight time to mean flight time | 0.4596 | N − 1 |
| Flight f1 + f2 + f3 | Flight sums by threes | 0.4591 | N − 3 |
| Flight/Max-Flight | Ratio of flight time to maximum flight time | 0.4392 | N − 1 |
| Down-Latency: d1 + f1 | Sum of one key's dwell time and the next key's flight time. | 0.4388 | N − 1 |
| Flight/Min-Flight | Ratio of flight time to minimum flight time | 0.4267 | N − 1 |
| Flight SND | Standard normal deviate:<br>(f − Avg(all f))/Sd(all f) | 0.4030 | N − 1 |
| Dwell d * (1/d-Min − 1/d-Max) | d-Min: minimum of all dwells<br>d-Max: maximum of all dwells | 0.3526 | N |
| Dwell/Median-Dwell | Ratio of dwell to median dwell | 0.3472 | N |
| Dwell/Min-Dwell | Ratio of dwell to minimum dwell | 0.3453 | N |
| Flight f1 − f2 | Differences between flight times | 0.3453 | N − 2 |
| Flight f1/f2 | Ratios of succeeding flight times | 0.3426 | N − 2 |
| Parabola-A-Flight | Highest order coefficient (of $x^2$) of a parabola through 3 consecutive flight points<br>points are (position in string, flight)<br>A measure for rhythm of 3 | 0.3237 | N − 3 |
| Log-Radius-Avg(f1, f2) | Log of radius of a circle through 3 consecutive points<br>Each point consists of (position in string, Avg(two consecutive flights)) | 0.3114 | N − 4 |
| Log-Radius-Avg(f1, f2, f3) | Log of radius of a circle through 3 consecutive points<br>Each point consists of (position in string, Avg(three consecutive flights)) | 0.3079 | N − 5 |
| Dwell Tendency | Quantized dwell tendencies as described herein | 0.3028 | N − 1 |
| Log-Radius-Flight | Log of radius of a circle through 3 consecutive points<br>Each point consists of (position in string, flight) | 0.3005 | N − 3 |
| Parabola-Curve-Dwell | Curvature of parabola through 3 consecutive points.<br>Points are (position in string, dwell) | 0.2885 | N − 2 |
| Log-Radius-Avg(d1, d2) | Log of radius of a circle through 3 consecutive points<br>Each point consists of (position in string, Avg(2 consecutive dwells)) | 0.2553 | N − 3 |
| Log-Radius-Dwell | Log of radius of a circle through 3 consecutive points<br>Each point consists of (position in string, dwell) | 0.2550 | N − 2 |
| Log-Radius-Avg(d1, d2, d3) | Log of radius of a circle through 3 consecutive points<br>Each point consists of (position in string, Avg(3 consecutive dwells)) | 0.2550 | N − 4 |
| Flight Sd | Flight standard deviation | 0.2428 | 1 |
| Parabola-Curv-Flight | Curvature of parabola through 3 consecutive points.<br>Points are (position in string, flight) | 0.2307 | N − 3 |
| Flight Max | Maximum flight time | 0.2231 | 1 |
| Parabola-Curv-UpLatency | Curvature of parabola through 3 consecutive points.<br>Points are (position in string, up-latency) | 0.2228 | N − 3 |
| 2f/(f− + f+) | Ratio of flight to Average of the 2 immediate neighbour flights<br>f−: previous flight time<br>f+: next flight time | 0.2058 | N − 3 |
| Parabola-Curv-DownLatency | Curvature of parabola through 3 consecutive points.<br>Points are (position in string, down-latency) | 0.2052 | N − 3 |

TABLE 4-continued

| Derived Data | Definition | Distinguishing Power | Data Points |
|---|---|---|---|
| Curv-Avg(f1, f2) | Curvature of circle through 3 consecutive points. Points are (position in string, Avg(2 consecutive flights)) | 0.1945 | N − 4 |
| Flight-Tendency | Quantized flight tendency as described herein | 0.1869 | N − 2 |
| Curv-Flight | Curvature of circle through 3 consecutive points. Points are (position in string, flight) | 0.1844 | N − 3 |
| Curv-Avg(f1, f2, f3) | Curvature of circle through 3 consecutive points. Points are (position in string, Avg(3 consecutive flights)) | 0.1804 | N − 5 |
| Curv-Avg(d1, d2) | Curvature of circle through 3 consecutive points. Points are (position in string, Avg(2 consecutive dwells)) | 0.1736 | N − 3 |
| 2d/(d− + d+) | Ratio of dwell to average of its two neighbour dwells in the sequence of keys | 0.1580 | N − 2 |
| Curv-Dwell | Curvature of circle through 3 consecutive points. Points are (position in string, dwell) | 0.1555 | N − 2 |
| Radius-Dwell | Radius of circle through 3 consecutive points. Points are (position in string, dwell) | 0.1528 | N − 2 |
| Curv-Avg(d1, d2, d3) | Curvature of circle through 3 consecutive points. Points are (position in string, Avg(3 consecutive dwells)) | 0.1515 | N − 4 |
| Radius-Avg(d1, d2) | Radius of circle through 3 consecutive points. Points are (position in string, Avg(2 consecutive dwells)) | 0.1469 | N − 3 |
| Radius-Avg(d1, d2, d3) | Radius of circle through 3 consecutive points. Points are (position in string, Avg(3 consecutive dwells)) | 0.1455 | N − 4 |
| Radius-Flight | Radius of circle through 3 consecutive points. Points are (position in string, flight) | 0.1409 | N − 3 |
| Radius-Avg(f1, f2) | Radius of circle through 3 consecutive points. Points are (position in string, Avg(2 consecutive flights)) | 0.1357 | N − 4 |
| Radius-Avg(f1, f2, f3) | Radius of circle through 3 consecutive points. Points are (position in string, Avg(3 consecutive flights)) | 0.1328 | N − 5 |

Note that the various metrics listed in Table 4 were computed from a single large experimental dataset containing raw keystroke data collected as many different users typed the same phrase, with instructions to either type as they normally would, or to attempt to type as a different user does. The metrics were then ranked on their individual ability to distinguish legitimate users from imposters. A naïve interpretation of the table would be that if a keystroke dynamics system was only going to use one measure to distinguish users, then the Dwell Total or Dwell Mean might provide the best performance. However, the rankings above do not take into account the number of data points available from a single phrase entry (this is the Data Points column; N is the number of characters in the phrase). In light of this, it is not surprising that Dwell Mean, which contains at least some information about every keystroke in the phrase, scores better than the plain Dwell time of any single keystroke. The contrived nature of the experimental samples seems to introduce significant biases. In a practical system, each user might have his own phrase, and impostor data would be more difficult to collect and analyze. Also, a practical system would base its enrollment and authentication decisions on several different metrics, not just one. Even though Dwell Tendency and Flight Tendency individually do not score highly, the set consisting of Dwell, Flight, Dwell Tendency and Flight Tendency has been found to outperform all other sets examined to date. Thus, a preferred embodiment computes Dwell and Flight values, derives Dwell Tendency and Flight Tendency from them, and provides those four values to the template-creation and candidate-authentication processes.

Note the inclusion in Table 4 of some rather esoteric metrics: parabola curve, radius and log-radius. These metrics treat three consecutive keystroke measurements (e.g., three consecutive dwells or flight times) as three, two-dimensional points, and examine a characteristic of a parabola or circle that passes through the points. The metrics provide a single number that encodes information about three keystrokes (for dwell-based measures) or four keystrokes (for flight-time-based measures). Further investigation of these (and similar) multi-keystroke metrics may expose useful information about a user's typing style and rhythm that can improve keystroke-dynamics identification.

The foregoing derived values expose various characteristics of a user's typing, in much the same way that derivatives of location with respect to time in the X, Y and Z directions expose various characteristics of a vehicle's motion. Some derivatives may be zero for some users, but may nevertheless highlight characteristic features of other users' typing. By calculating the derived values and providing them to the enrollment and authentication processes, an embodiment of the invention can highlight latent information in the raw data samples so that the system functions more effectively. Note that some of the derived values in Table 4 approximate a mathematical derivative of a function, defined as "rate of change of a dependent variable with respect to an independent variable;" while others are "derived" in the sense that they are calculated from predicate or precursor values. Dwell ratio and flight ratio are examples of this second sense.

A keystroke dynamics authentication system can use the derived values described above like any other data values concerning a user's typing style that can be collected or computed. For example, a statistical system may create an m-dimensional vector containing average key dwell tendency values computed when a user enrolls, and include this vector in the template. (m is an integer one less than the number of character-generating keystrokes in the phrase: for a seven-character phrase, there will be six key dwell tendency values.) During authentication, a similar m-dimensional vector of key dwell tendencies, computed based on a candidate's single entry of the phrase, may be examined to find its Euclidean distance from the corresponding vector in the template. The probability that the candidate is the same as the enrolling user is inversely proportional to the Euclidean distance. (It is probably more accurate to say that the probability is strongly negatively correlated with the distance.)

A neural-network-based keystroke dynamics authentication system may produce a template from raw data and derived values by a complex learning algorithm that obscures the precise physical meaning of any particular template element. However, such a template can be used to classify a set of raw and derived keystroke data collected and computed during an authentication attempt as either "like" or "unlike" the data that went into the template. If the neural network classifies a candidate's authentication sample as "like" the template, then it is probable that the candidate is the same as the user who enrolled.

Figure 6:
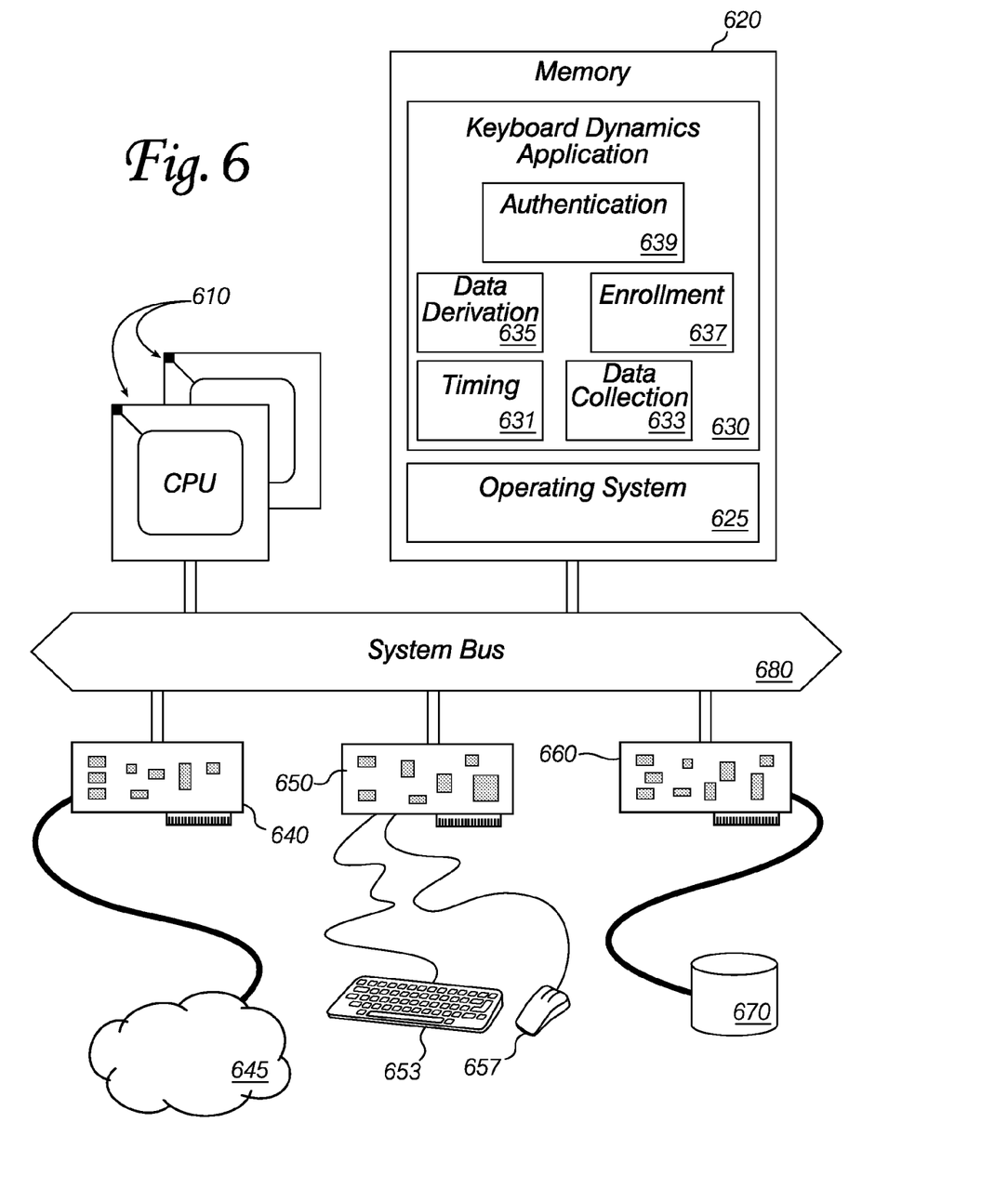
FIG. 6 is a block diagram of a system that implements an embodiment of the invention.

FIG. 6 shows some components and subsystems of a computer system that implements an embodiment of the invention. Central processing units (CPUs) 610 are programmable processors that execute according to instructions and data in memory 620 to perform the methods described above. Memory 620 may include portions containing data and instructions to implement an operating system ("OS") 625 and a keystroke dynamics application 630 incorporating an embodiment of the invention. Keystroke dynamics application 630 may include a number of different modules, such as timing logic 631, keystroke data collection logic 633, data derivation logic 635; and enrollment logic 637 and authentication logic 639 to perform operations similar to those described with reference to FIGS. 1 and 2, based on raw and derived data from the data collection logic 633 and data derivation logic 635. The system may include a network adapter 640 to support communications with other systems (not shown) via a distributed data network 645. Another interface adapter 650 may facilitate coupling the system to user interface devices such as keyboard 653 and mouse 657. In many systems, user interface devices are connected to a built-in controller, rather than to a "plug in" expansion card. A mass storage interface 660 permits the system to store data on a device like hard disk 670. Thus, for example, user identification templates and related data can be stored for later use by keyboard dynamics application 630. These and other components and subsystems of the computer system are connected to, and exchange data and control signals via, a system bus 680.

Figure 7:
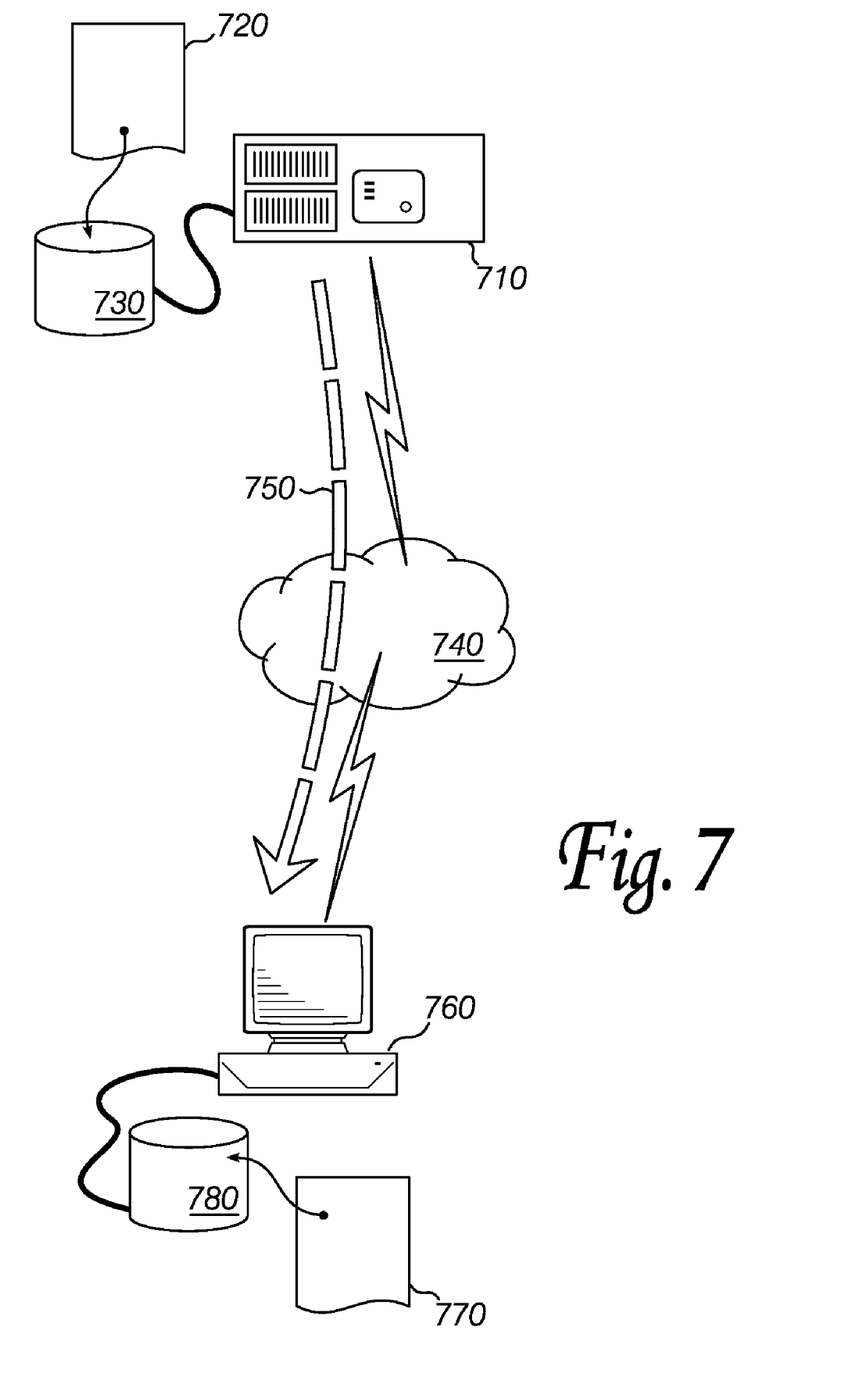
FIG. 7 shows two systems interacting according to an embodiment of the invention.

FIG. 7 shows another embodiment of the invention. A system 710 has a group of instructions and data (shown as document 720), which may be stored on a mass storage device 730. These instructions and data are to cause a programmable processor to implement a method according to an embodiment of the invention. System 710 is connected to a distributed data network 740 such as the Internet. Another system 760, also connected to the distributed data network 740, may request a copy of document 720. In response, system 710 modulates a carrier signal to carry instructions and data 720, and sends the modulated signal to system 760 (this transmission is shown by dashed arrow 750). When system 760 receives the modulated signal, it extracts the encoded instructions and data and stores them on its mass storage device 780, producing document 770, an embodiment of the invention that satisfies the description "a computer-readable medium storing data and instructions to cause a programmable processor to perform operations" as described above. If system 760 executes those instructions, it may perform a method according to the invention.

An embodiment of the invention may be a machine-readable medium having stored thereon data and instructions to cause a programmable processor to perform operations as described above. In other embodiments, the operations might be performed by specific hardware components that contain hardwired logic. Those operations might alternatively be performed by any combination of programmed computer components and custom hardware components.

Instructions for a programmable processor may be stored in a form that is directly executable by the processor ("object" or "executable" form), or the instructions may be stored in a human-readable text form called "source code" that can be automatically processed by a development tool commonly known as a "compiler" to produce executable code. Instructions may also be specified as a difference or "delta" from a predetermined version of a basic source code. The delta (also called a "patch") can be used to prepare instructions to implement an embodiment of the invention, starting with a commonly-available source code package that does not contain an embodiment.

In the preceding description, numerous details were set forth. It will be apparent, however, to one skilled in the art, that the present invention may be practiced without these specific details. In some instances, well-known structures and devices are shown in block diagram form, rather than in detail, to avoid obscuring the present invention.

Some portions of the detailed descriptions were presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or the like, refer to the action and processes of a computer system or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, compact disc read-only memory ("CD-ROM"), and magnetic-optical disks, read-only memories ("ROMs"), random access memories ("RAMs"), eraseable, programmable read-only memories ("EPROMs"), electrically-eraseable read-only memories ("EEPROMs"), Flash memories, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), and so on.

The applications of the present invention have been described largely by reference to specific examples and in terms of particular allocations of functionality to certain hardware and/or software components. However, those of skill in the art will recognize that improved keystroke dynamic authentication can also be achieved by software and hardware that distribute the functions of embodiments of this invention differently than herein described. Such variations and implementations are understood to be captured according to the following claims.

We claim:

1. A method comprising:
    collecting timestamps of key-press and key-release events detected during keyboard entry of a phrase, wherein the events are presses and releases of keys of a keyboard by one person;
    calculating key dwell times from the key-press and key-release timestamps;
    calculating a sum of key dwell times from the key-press and key-release timestamps;
    calculating key flight times from the key-press and key-release timestamps;
    calculating a sum of key flight times from the key-press and key-release timestamps;
    calculating dwell tendency values corresponding to the key dwell times;
    calculating flight tendency values corresponding to the key flight times; and
    preparing a keystroke dynamics template from data including the sum of dwell times, the sum of flight times, the dwell tendency values, and the flight tendency values.

2. The method of claim 1 wherein the keystroke dynamics template contains information to distinguish a first user who performed the keyboard entry of the phrase from a second user who did not perform the keyboard entry of the phrase, and wherein the phrase is a password of the one person.

3. The method of claim 1, further comprising:
    disregarding key-press and key-release events of modifier keys.

4. The method of claim 1 wherein the keystroke dynamics template comprises an n-dimensional vector containing mean values of the dwell tendency values, and wherein n is an integer one less than a number of characters in the phrase.

5. The method of claim 1 wherein preparing comprises:
    training a neural network with data including the dwell tendency values to produce the keystroke dynamics template.

6. The method of claim 5, further comprising:
    using the keystroke dynamics template to classify an authentication sample as either "like" or "unlike" the data from which the keystroke dynamics template was prepared; and
    if the authentication sample is "like" the keystroke dynamics template data, granting access to a candidate.

7. The method of claim 1, wherein the dwell tendency values are quantized into three to five states.

8. The method of claim 1, further comprising calculating second and third order derivatives of the key press and key release time stamps; and preparing the keystroke dynamic template from data including the second and third order derivatives.

9. The method of claim 1, further comprising calculating a characteristic of a parabola or circle that passes through three, two dimensional points of three consecutive keystroke dwells or flight times; and preparing the keystroke dynamics template from data including the parabola or circle.

10. A method comprising:
    collecting timestamps of key-press and key-release events detected during keyboard entry of a phrase, wherein the events are presses and releases of keys of a keyboard by a person;
    calculating key dwell times from the key-press and key-release timestamps;
    calculating dwell tendency values corresponding to the key dwell times;
    calculating key flight times from the key-press and key-release timestamps;
    calculating flight tendency values corresponding to the key flight times, and wherein preparing a keystroke dynamics template from data including the dwell tendency values and the flight tendency values.

11. The method of claim 10 wherein the keystroke dynamics template is prepared from data including all of the key dwell times, dwell tendency values, key flight times and flight tendency values.

12. A method comprising:
    collecting a plurality of real data points of a user operating a keyboard, wherein the plurality of real data points are key press time and key release time for each of a plurality of key strokes of a keyboard pressed and released by one single user;
    computing a first plurality of derived dwell data points based on the plurality of real data points;
    computing a second plurality of derived dwell tendency data points based on the first plurality of derived data points; and
    preparing a user authentication template based on the first plurality of derived dwell data points and the second plurality of derived dwell tendency data points.

13. The method of claim 12 wherein preparing comprises using the first and second pluralities of derived data points to train a neural network.

14. The method of claim 12 wherein
    the second plurality of derived data points are quantized into three states corresponding to decreasing values of an underlying derived data point, unchanged values of the underlying derived data point, or increasing values of the underlying derived data point.

15. The method of claim 12 wherein the second plurality of derived data points approximates a rate of change of the first plurality of derived data points with respect to an independent variable.

16. The method of claim 15 wherein the independent variable is time.

17. A method comprising:
collecting a plurality of real data points of a user operating a keyboard;
computing a first plurality of derived data points based on the plurality of real data points;
computing a second plurality of derived data points based on the first plurality of derived data points;
preparing a user authentication template based on the first plurality of derived data points and the second plurality of derived data points, wherein
the plurality of real data points comprises a key press time and a key release time for each of a plurality of keystrokes of a keyboard pressed and released by a user,
the first plurality of derived data points comprises at least one of a key dwell time, a key flight time, a key press latency or a key release latency; and
the second plurality of derived data points comprises at least one of a dwell tendency, a flight tendency, a press latency tendency or a release latency tendency.

18. A non-transitory computer-readable medium storing data and instructions to cause a programmable processor to perform operations comprising:
prompting a user to enter a phrase using a keyboard;
collecting timestamps of key-press and key-release events as the user enters the phrase to an enrollment sample;
repeating the prompting and collecting operations at least once to produce a plurality of enrollment samples;
for each enrollment sample, computing a first derived value from the collected timestamps of the enrollment sample, and computing a second derived value from the first derived value, wherein the first derived value comprises a key dwell time and the second derived value comprises a key dwell tendency; and
constructing a template to identify the user by a typing style of the user, said template incorporating the first derived value and the second derived value from each of the enrollment samples.

19. The computer-readable medium of claim 18 wherein the phrase is a first phrase, the medium storing additional data and instructions to cause the programmable processor to perform operations comprising:
prompting a candidate to enter a second phrase using the keyboard;
collecting timestamps of key-press and key-release events as the candidate enters the second phrase to form an authentication sample;
computing a third derived value from the collected timestamps of the authentication sample, and computing a fourth derived value from the third derived value;
comparing the first phrase with the second phrase;
comparing the template with the third derived value and the fourth derived value; and
if the first phrase matches the second phrase and the template matches the third derived value and the fourth derived value, granting access to the candidate.

20. The computer-readable medium of claim 18 wherein the first derived value also comprises a key flight time and the second derived value also comprises a key flight tendency.

21. The computer-readable medium of claim 20 wherein the second derived value also includes a key dwell ratio.

22. The computer-readable medium of claim 18 wherein constructing the template comprises training a neural network with the first derived value and the second derived value from each of the enrollment samples, the neural network to classify an authentication sample as either "like" or "unlike" the enrollment samples.

* * * * *